(12) United States Patent
Young (10) Patent No.: US 9,678,360 B2
(45) Date of Patent: Jun. 13, 2017

(54) EYEGLASSES WITH REMOVABLE TEMPLES AND METHOD

(71) Applicant: Eric J. Young, Fairport, NY (US)

(72) Inventor: Eric J. Young, Fairport, NY (US)

(73) Assignee: Aaron Markovitz, Holly Hill, FL (US)

( * ) Notice: Subject to any disclaimer, the term of this patent is extended or adjusted under 35 U.S.C. 154(b) by 56 days.

(21) Appl. No.: 14/745,360

(22) Filed: Jun. 19, 2015

(65) Prior Publication Data

US 2016/0033790 A1 Feb. 4, 2016

Related U.S. Application Data (60) Provisional application No. 61/999,486, filed on Jul. 29, 2014.

(51) Int. Cl.
*G02C 5/22* (2006.01)

(52) U.S. Cl.
CPC ......... *G02C 5/2254* (2013.01); *G02C 5/2209* (2013.01); *G02C 2200/06* (2013.01); *G02C 2200/16* (2013.01)

(58) Field of Classification Search
CPC .............. G02C 5/16; G02C 5/06; G02C 5/22
USPC ...................... 351/153, 41; 16/228
See application file for complete search history.

(56) References Cited

U.S. PATENT DOCUMENTS

| | | | |
|---|---|---|---|
| 3,025,762 A * | 3/1962 | Vigano | G02C 5/2254 16/228 |
| 4,896,955 A | 1/1990 | Zider et al. | |
| 4,978,209 A | 12/1990 | Ohba | |
| 5,009,495 A | 4/1991 | Williams | |
| 5,410,374 A | 4/1995 | Smith | |
| 5,583,588 A * | 12/1996 | Chao | G02C 5/008 16/228 |
| 5,631,719 A * | 5/1997 | Chao | G02C 5/008 16/228 |
| 5,642,178 A | 6/1997 | Leonardi | |
| 5,975,693 A * | 11/1999 | Malfroy | G02C 5/008 16/228 |
| 7,690,786 B2 | 4/2010 | Weid | |
| 2004/0075806 A1* | 4/2004 | Tribuiani | G02C 5/2227 351/153 |
| 2014/0071396 A1 | 3/2014 | Kuo | |

\* cited by examiner

*Primary Examiner* — Hung Dang
(74) *Attorney, Agent, or Firm* — Charles A. Lemaire; Jonathan M. Rixen; Lemaire Patent Law Firm, P.L.L.C.

(57) ABSTRACT

Eyeglasses that include a frame and temple members, wherein the temple members are hinged to the frame by a resilient member and hinge structure so that the temple members are preferentially retained in open or closed position. In some embodiments, the resilient member and hinge structure act as a spring to restore temple members that have been over-extended to their preferred open orientation.

13 Claims, 6 Drawing Sheets

FIG. 6A (Top view)
Ball in lens frame-socket in temple

FIG. 7A (Top view)
Ball in temple-socket in lens frame

EYEGLASSES WITH REMOVABLE TEMPLES AND METHOD

CROSS-REFERENCE TO RELATED APPLICATION

This application claims priority benefit, under 35 U.S.C. §119(e), of U.S. Provisional Patent Application No. 61/999,486, filed Jul. 29, 2014 by Eric Young, titled "EYEGLASSES WITH REMOVABLE TEMPLES," which is incorporated herein by reference in its entirety.

FIELD OF THE INVENTION

The invention is in the design of eyeglasses wherein a resilient hinge element is provided to allow some flexing of the temple members with respect to the frame, allow convenient interchangeability of the temple members, avoid use of metallic hinges and springs, and retain the temple members of the eyeglasses with respect to the frame in bi-stable fashion, that is, stable and non-floppy in both the open and the folded positions.

BACKGROUND OF THE INVENTION

Eyeglasses are of course well known. The typical pair of eyeglasses includes a frame retaining left and right corrective lenses, and left and right temple members (also simply called "temples"), joined at proximal ends thereof to the frame at respective hinges permitting the temple members to be moved between the open position, in which the distal ends of the temple members fit over the wearer's ears, and the closed position, in which the temple members are folded approximately parallel to the frame, for convenient storage. Conventional hinges may be metallic or molded of plastic, and may be integral with the either or both of the frame and temple members, or may be assembled thereto.

The hinges of eyeglasses are susceptible to being broken by rough handling, so that it would be desirable to provide some resilience in the hinge structure. It is known to provide spring-loaded hinges, reducing this problem to some extent, but such hinge structures are rather expensive. Further, in general it is not possible to interchange the temple members, as might be desired for purposes of fashion or utility, for example to exchange normal temple members with ones including a retaining strap passing around the wearer's head so as to avoid the glasses becoming lost, e.g., during sports activities.

Prior art located in a search includes U.S. Pat. No. 5,410,374 to Smith, which shows several embodiments of eyeglasses employing flexible members, which may be made of rubber or the like to retain the temple member to the frame while allowing pivoting. An O-ring is specifically shown; see FIG. 4 (f) of U.S. Pat. No. 5,410,374. However, the specific design does not appear to allow convenient removal of the temple members from the glasses.

Less relevant are U.S. Pat. No. 5,642,178 to Leonardi, which shows sports glasses wherein a resilient member is employed to connect a strap to the frame of the glasses; U.S. Pat. No. 6,116,733 to Krume, which shows a snap-fit connection of temple members to frame; and U.S. Pat. No. 4,408,924 to Huebner, which simply shows use of an O-ring to retain parts in a motorcycle fork assembly.

U.S. Pat. No. 5,009,495 to Williams shows a resilient member as part of an eyeglass hinge. U.S. Pat. No. 6,751,811 to Hill shows an elastomeric tensile member as part of an eyeglass assembly. U.S. Patent Application Publication 2011/0116898 of Malavasi shows a molded fastener for securing lenses to frames.

U.S. Patent Application Publication 2014/0071396 of Kuo shows a T-shaped member on the temple member received in a recess on the frame by a snap-fit action, to allow pivoting of the temple members with respect to the frame.

U.S. Pat. No. 7,690,786 to Weid shows a snap-fit connection of temple members to a frame that includes a split member having two recesses to receive posts. However, the pivoting function is provided by a separate hinge structure.

Also located was U.S. Pat. No. 4,978,209 to Ohba, which shows a hinge for glasses that includes a U-shaped wire member that is fixed to the temple member. The ends of the wire fit into shaped recesses in the frame. The wire is deformed to allow pivoting between bi-stable open and closed positions. U.S. Pat. No. 5,847,801 to Matsunaga is generally similar. U.S. Pat. No. 7,264,349 to Ku shows a temple member having a T-shaped member received in a block having a slot allowing the temple member to be pivoted.

All of the U.S. patents and patent applications mentioned in this disclosure are incorporated herein by reference in their entirety for all purposes.

There remains a need for an improved mechanism for detachably attaching temple members to the lens frame in eyeglasses.

SUMMARY OF THE INVENTION

The present invention relates to an improvement in the hinge structure joining the temple members to the frame. As above, the objects of the invention include at least the following: employment of a resilient member as the hinging element to allow some flexing of the temple members with respect to the frame, allowing convenient interchangeability of the temple members, and avoidance of metallic hinges and springs, while allowing the temple members of the eyeglasses to be secured with respect to the frame in bi-stable fashion, that is, in the open and folded positions.

In one preferred embodiment, a standard rubber O-ring is employed as the resilient element. The temple member and frame include cooperating arcuate shapes so as to allow pivoting of the temple member with respect to the frame. An "omega" shaped pin receives one end of the O-ring and is itself received in a transverse slot in the frame. The other end of the O-ring passes through the frame, and is received over a U-shaped protrusion on the inside surface of the temple, extending toward the nosepiece, so that the O-ring can be stretched to allow removal of the temple member. The U-shaped protrusion is shaped so that the O-ring is preferably received in either of two recesses, whereby the temple member is retained bi-stably in the open and folded positions.

In a slightly-modified embodiment, the O-ring is replaced by a custom-molded rubber member, having a loop at one end that cooperates with the T-shaped protrusion on the temple member as did the O-ring, but having a retaining member received in a cooperating aperture in the frame in lieu of the omega-shaped pin.

BRIEF DESCRIPTION OF THE DRAWINGS

The invention will be better understood if reference is made to the accompanying drawings, in which.

DETAILED DESCRIPTION OF THE INVENTION

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1A:
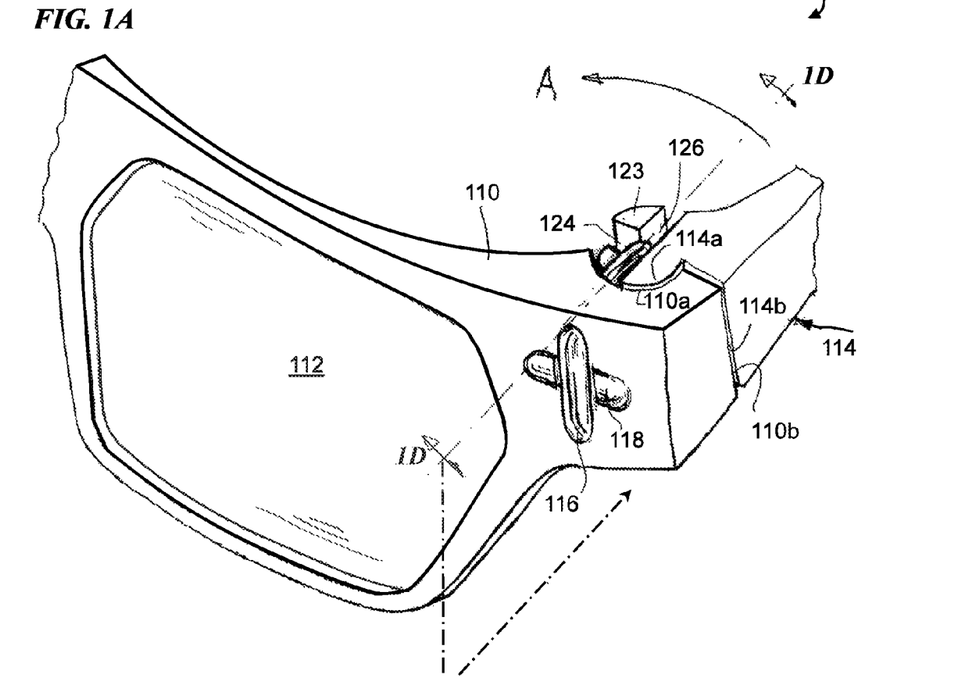
FIG. 1A is a perspective view of the left hinge section of a pair of eyeglasses 101 including a temple hinge according to some embodiments of the present invention.
Figure 1B:
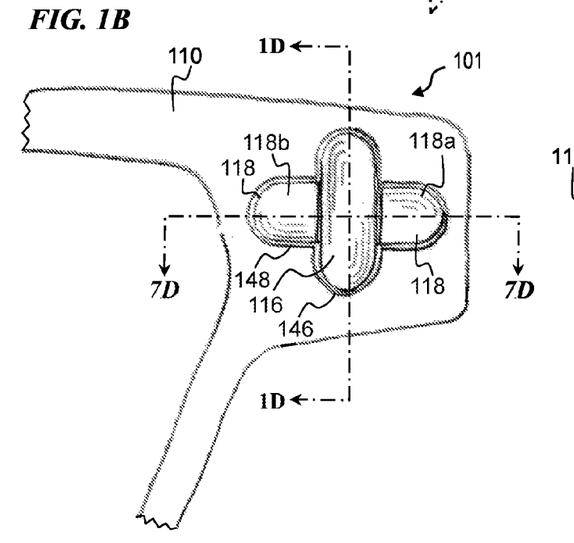
FIG. 1B is a front elevational view of the hinge portion of the frame 110.

FIG. 1A is a perspective view of the left hinge portion of a pair of eyeglasses 101 including a temple hinge of the invention, according to some embodiments. As illustrated in FIGS. 1A, 1B and 1D, eyeglasses according to some embodiments of the present invention include a frame 110 configured to retain corrective lenses 112 (a portion of the left lens 112 only being illustrated in FIG. 1A) and temple members 114 (again only a portion of the left temple member 114 is shown in FIG. 1A). In some embodiments, temple member 114 is secured to frame 110 by an O-ring 116. In the embodiment shown, O-ring 116 is secured to the frame by way of an "omega-shaped" pin 118, such as that illustrated in detail by FIG. 1C. As there illustrated, pin 118 has opposed end sections 118a and 118b, which fit into corresponding recesses 148 in the front surface of frame 110, and a generally semi-circular center section 118c, which receives a proximal portion of O-ring 116. The distal portion of O-ring 116 then fits through an aperture 146 (see FIG. 1F) in frame 110. Pin 118 may be stamped of steel or brass wire, for example, in which case its cross-section will be generally uniform, or molded of plastic, in which case the opposed end sections 118a and 118b may have a round cross-section while the center section 118c may be square in cross-section, as illustrated.

Figure 5A:
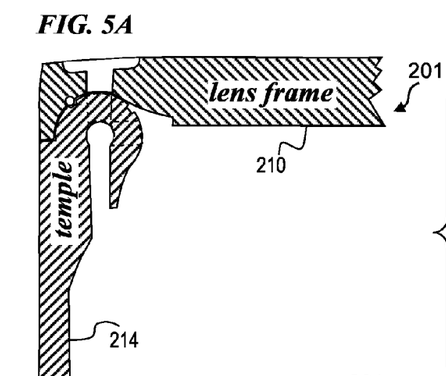
FIG. 5A is a cross-sectional plan view of a hinge portion 201 along the cut plane 5A-5A of FIG. 2A with temple member 214 in the stable extended position.
Figure 5B:
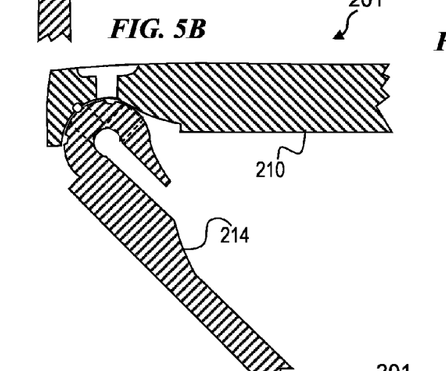
FIG. 5B is a cross-sectional plan view of hinge portion 201 with temple member 214 in an unstable partially folded position.
Figures 5C, 5D, 5G:
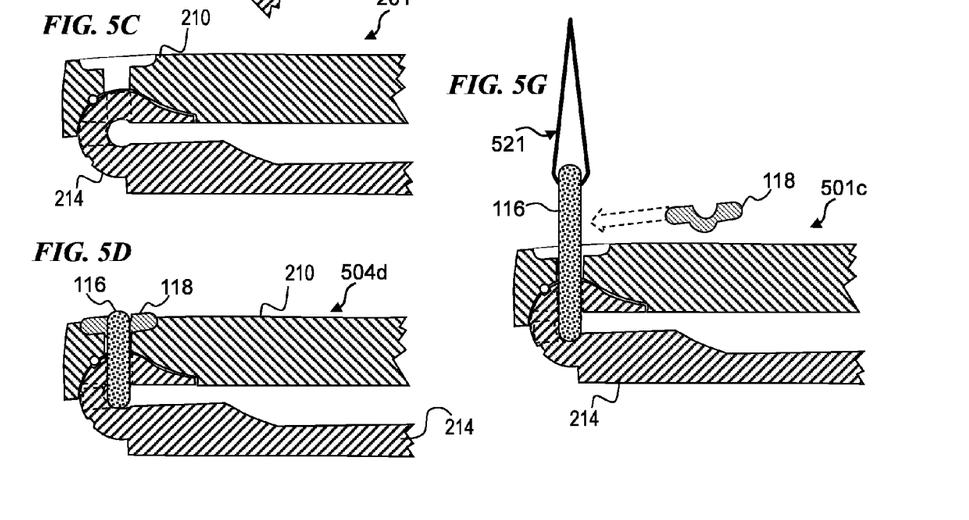
FIG. 5C is a cross-sectional plan view of hinge portion 201 with temple member 214 in the stable folded position.
FIG. 5D is a cross-sectional plan view of hinge portion 201 with temple member 214 in the stable folded position also showing O-ring 116 and retaining pin 118.
FIG. 5G is a cross-sectional plan view of hinge portion 201 with temple member 214 disconnected, showing the operation of stretching O-ring 116 through aperture 246 in frame 210 by pulling thread 521, in order to insert retaining pin 118.
Figure 7A:
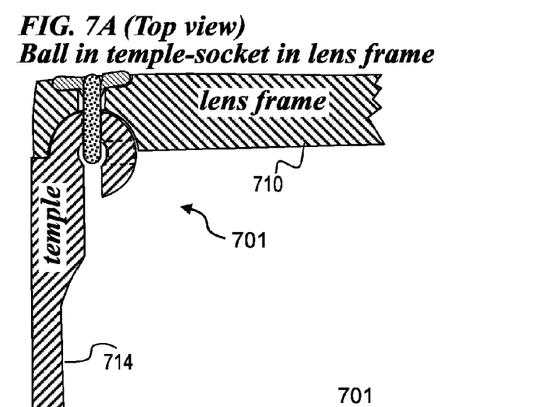
FIG. 7A is a cross-sectional plan view of a hinge portion 701 according to another embodiment of the present invention (along a cut line similar to the cut plane 5A-5A of FIG. 2A) with temple member 714 in the stable extended position.

As shown by FIG. 1A, frame 110 and temple member 114 have concentric mating curved surfaces (concave surface 110a of frame 110 and convex surface 114a of temple member 114 respectively), so that the temple member 114 can be rotated with respect to the frame 110 about a vertical axis (the common axis of the two concentric surfaces from the open position such as shown in FIG. 1A and FIG. 5A to a closed or folded position such as shown in FIG. 5C, for convenient storage. In some embodiments, the touching portions of convex surface 114a are formed from a truncated cylinder having a semicircular horizontal cross section, and the touching portions of concave surface 110a are formed by removing a truncated cylinder having a semicircular horizontal cross section. In other embodiments, the convex mating surface is ovoid, obovoid or other suitable shape, and the concave mating surface conforms to the convex mating surface. In still other embodiments, any suitable cylindrical-joint surfaces are used, wherein the cylindrical joint is held together by O-ring 116. In some embodiments (such as shown in FIGS. 1A and 7A, for example), a convex surface is formed at the end of each temple member and the concave surfaces are formed in the sides of the lens frame.

Figure 6A:
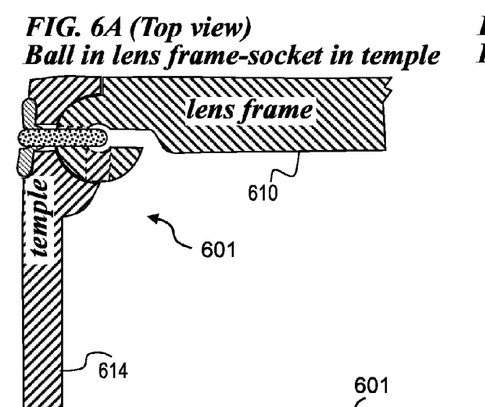
FIG. 6A is a cross-sectional plan view of a hinge portion 601 according to another embodiment of the present invention (along a cut line similar to the cut plane 5A-5A of FIG. 2A) with temple member 614 in the stable extended position.

In other embodiments (such as shown in FIG. 6A, for example), a concave surface is formed at the end of each temple member and the convex surfaces are formed on the sides of the lens frame. In some embodiments, surfaces 110b and 114b are flat planar surfaces configured to abut when the temple members are in the open position. In other embodiments, surfaces 110b and 114b are curved, angular or other suitable surfaces that abut and substantially conform to one another when the temple members are in the open position (e.g., in some embodiments, the long axis of each temple member is substantially perpendicular to a major front surface of the frame when in the open or extended position, and is substantially parallel to a major front surface of the frame when in the open or extended position. In some embodiments, surfaces 110b and 114b form a fulcrum pivot when the temple members 114 are spread too far open, stretching O-ring 116, and the resilient O-ring 116 provides a spring return to urge the temple members 114 to the desired snug position against the head of the person wearing the eyeglasses. In such embodiments, the distal end of O-ring 116 not only serves as a "hinge-pin" (since O-ring 116 eliminates the need for a conventional hinge pin or screw) wherein the axis of rotation passes through the distal end of O-ring 116, but O-ring 116 also provides the spring force needed to urge over-extended temple members back to their desired snug position.

Figure 7B:
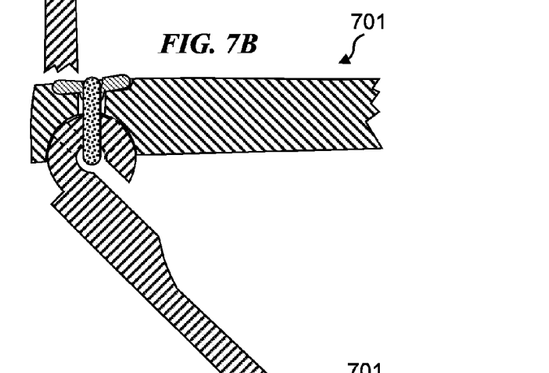
FIG. 7B is a cross-sectional plan view of hinge portion 701 with temple member 714 in an unstable partially folded position.

FIG. 1B is a front elevational view of the hinge portion of the frame 110 of eyeglasses 101, according to some embodiments. In some embodiments, both the left corner (shown here) and the right corner (not shown, but being the mirror image of the left corner) include a through aperture 146 through which O-ring 116 extends rearward, and a front-side retaining groove 148 into which retaining pin 118 is recessed and held. The cross-section view of FIG. 1D is taken along cut line 1D-1D, and the cross-section view of FIG. 7D is taken along cut line 7D-7D.

Figure 1C:
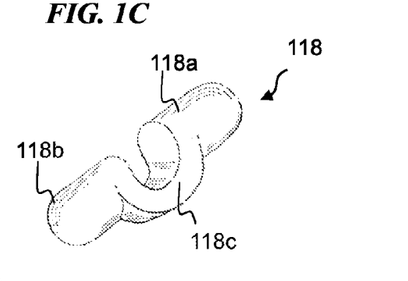
FIG. 1C is a perspective view of an "omega-shaped" pin 118 used in some embodiments of the hinge assembly.
Figures 1D, 1E:
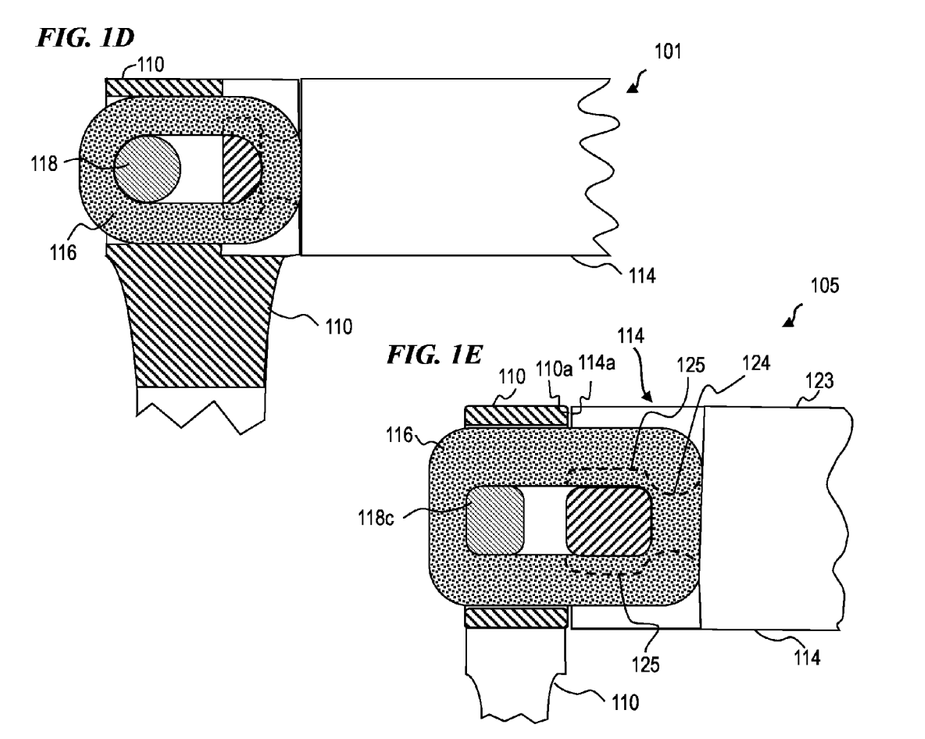
FIG. 1D is a cross-sectional view of the left-hand hinge section of a pair of eyeglasses 101 along the line 1D-1D of FIG. 1A.
FIG. 1E is a cross-sectional view of a right-hand hinge section of a pair of eyeglasses 105 (an alternative embodiment of the present invention) along a section line similar to the line 1D-1D of FIG. 1A.

FIG. 1C is a perspective view of an "omega-shaped" pin 118 used in some embodiments of the hinge assembly. In some embodiments, retaining pin 118 has opposed end sections 118a and 118b, which fit into corresponding recesses 148 in the front surface of frame 110 (see FIG. 1B), and a generally semi-circular center section 118c, which receives a proximal portion of O-ring 116.

FIG. 1D is a side elevation cross-sectional view of the left-hand hinge section of a pair of eyeglasses 101 along the line 1D-1D of FIG. 1B, according to some embodiments. The reference numbers here are explained above.

FIG. 1E is a cross-sectional view of a right-hand hinge section of a pair of eyeglasses 105 (an alternative embodiment to embodiment 101 of the present invention) along a section line similar to the line 1D-1D of FIG. 1B. This embodiment is substantially functionally identical to eyeglasses embodiment 101 of FIG. 1D, but has a slightly different shape for some elements (e.g., the center portion 118c of pin 118 has a more square shape in the embodiment of FIG. 1E, and a more circular shape in the embodiment of FIG. 1D, and the groove at the end of temple member 114 has a more square shape in the embodiment of FIG. 1E, and a more semi-circular shape in the embodiment of FIG. 1D).

Figure 1F:
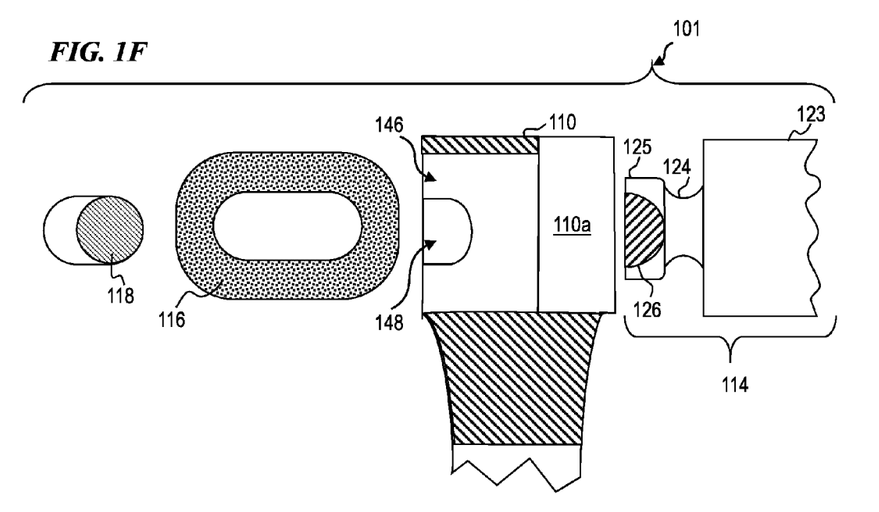
FIG. 1F is an exploded cross-sectional view of the left-hand hinge section of a pair of eyeglasses 101 showing O-ring 116, frame 110 and temple member 114 along the line 1D-1D of FIG. 1A.

FIG. 1F is an exploded cross-sectional view of the left-hand hinge section of a pair of eyeglasses 101 showing O-ring 116, frame 110 and temple member 114 along the line 1D-1D of FIG. 1A. The reference numbers here are explained above. Groove 124 holds O-ring 116 when the temple member 114 is in the folded orientation and groove 126 holds O-ring 116 when the temple member 114 is in the extended orientation, while raised areas 125 cause the O-ring 116 to stretch more such that the intermediate orientations between folded and extended are somewhat unstable and will tend to re-orient the temple member into one of the more stable folded or extended orientations.

Figure 7C:
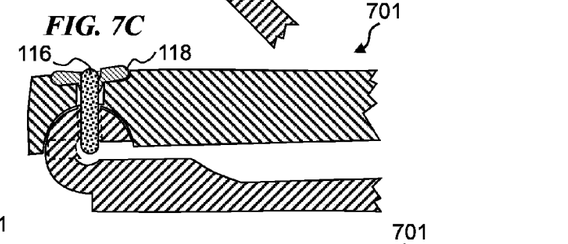
FIG. 7C is a cross-sectional plan view of hinge portion 701 with temple member 714 in the stable folded position.
Figure 7D:
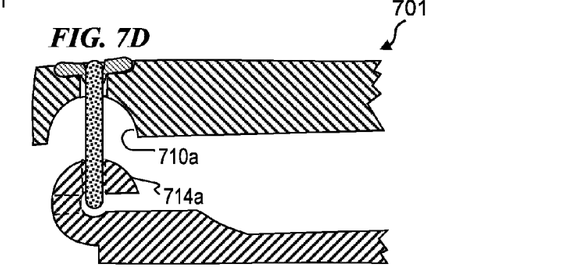
FIG. 7D is a cross-sectional plan view of hinge portion 701 with temple member 714 held away from frame 710 showing O-ring 116 in a stretched condition.

As noted above, it is desirable that the temple member be retained in a bi-stable fashion, that is, so that the temple member is retained in either of the open position (e.g., as shown in FIG. 7A) and the folded position (as shown in FIG. 7C), that the temple member be readily removable, and that the hinge structure provide a degree of resilience, to provide some protection against damage due to rough handling. Employment of the elastomeric O-ring 116 to secure the temple member 114 to the frame 110 provides the resilience needed. Cooperation between the O-ring 116 and hinge structure 120 formed on the temple member 114 provides bi-stable retention of the temple member in the open and folded positions, and allows ready interchangeability of the temple, in a manner which will now be described.

Figure 2A:
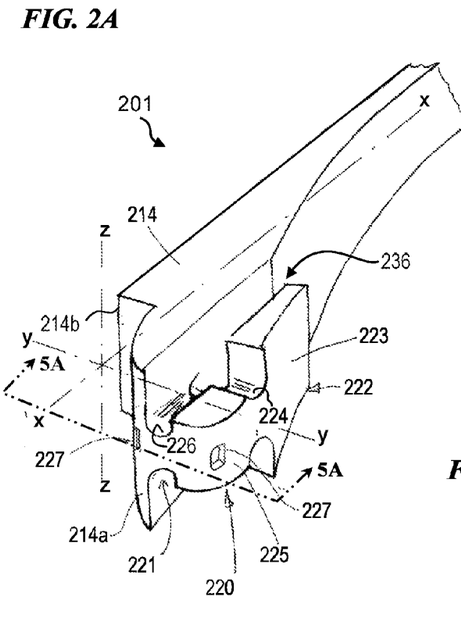
FIG. 2A is a perspective view of the hinge portion 201 of a right-hand temple member 214 according to some embodiments of the present invention.

FIG. 2A is a perspective view of the hinge portion 201 of a right-hand temple member 214 according to some embodiments of the present invention. In some embodiments, temple member 214 (similar to temple member 114 of FIG. 1A) includes a long axis extending the X direction when in the open orientation and in the Y direction when in the folded orientation. In some embodiments, temple member 214 includes a convex cylindrical front face 214a that mates with a corresponding concave surface 214a in the lens frame 214 (see FIG. 5E), a planar stop surface 214b that abuts a corresponding planar stop surface on lens frame 210 when the temple member is in the open orientation.

Figure 2B:
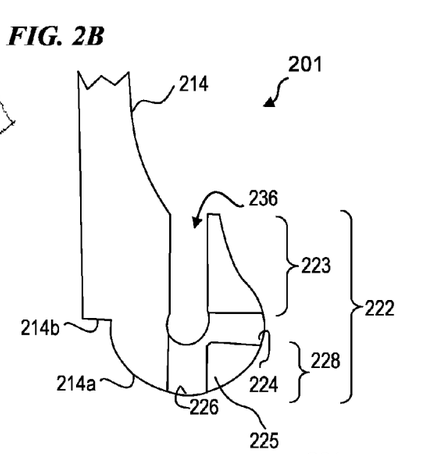
FIG. 2B is a plan view of the hinge portion 201 of right-hand temple member 214 according to some embodiments of the present invention.

FIG. 2B is a plan view of the hinge portion 201 of right-hand temple member 214 according to some embodiments of the present invention.

Figure 2C:
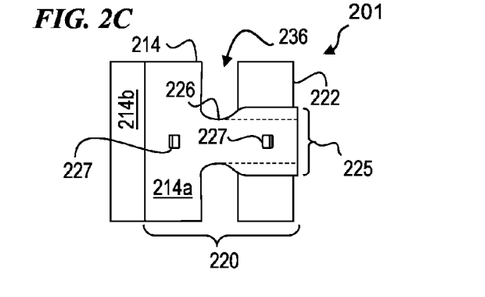
FIG. 2C is an end-elevation view of the hinge portion 201 of right-hand temple member 214 according to some embodiments of the present invention.

FIG. 2C is an end-elevation view of the hinge portion 201 of right-hand temple member 214 according to some embodiments of the present invention.

As shown in FIGS. 2A, 2B, and 2C, the temple member 214 has a longitudinal axis indicated by the line X-X. Hinge structure 220, which cooperates with the frame 210 and the O-ring 116, is located at a proximal end of the temple member 214. Hinge structure 220 is generally U-shaped in plan view, that is, looking downwardly along axis Z-Z, so as to define a central tongue 228 having a cylindrical forward surface 214a extending forward from generally along the axis Y-Y and a rearwardly extending member 222, extending parallel to the axis of elongation X-X of the temple member 214. Member 222 varies in width taken along the Z-Z dimension; as illustrated, it includes a rear-most section 223 that is widest top-to-bottom, a first channel section 224 forward of rear-most section 223 that is narrow, and an intermediate section 225 that is wider than first channel section 224 but narrower than rear-most section 223. Central tongue 228 joins the rearward portion of temple member 214 to rearwardly-extending member 222, defines a second channel section 226 of narrow cross-section as compared to intermediate section 225, and also continues the convex arcuate surface 214a of tongue 228 of temple member 214 bearing against concave surface 210b of frame 210 (see FIG. 5E and FIGS. 5A, 5B and 5C).

In some embodiments, O-ring 116 is inserted through slot 235 with its central opening slipped over member 222 and onto tongue 228 and placed in groove 226 extending forward. In some embodiments, a filament made of thread or wire is inserted through O-ring 116 and the ends of the thread or wire are passed through aperture 148 and pulled to stretch the O-ring 116 through aperture 148, and retaining pin 118 is inserted into the opening in the O-ring 116 and into the retaining recess 146 and the filament (thread or wire) is removed.

In some other embodiments, the assembly of the temple member 214 to the frame 210 has the O-ring 116 slipped over the pin 118, and the distal portion of the O-ring 116 pushed through aperture 146 in frame 210. The rear-most section 223 is then inserted through the distal portion of the O-ring 116, and the O-ring 116 worked along the extent of rearwardly-extending member 222. The O-ring 116 is sized so that it is under tension even when it is fitted into one or the other of first and second channel sections 228 and 226. Since these are portions of rearwardly-extending member 222, the O-ring 116 tends to fit preferentially into one or the other of first and second channel sections 224 and 226. More specifically, because the O-ring 116 is constantly under tension after the assembly is assembled, but is under less tension when disposed in one or the other of first and second channel sections 224 and 226, the tension in the O-ring 116 tends to urge the temple member into either the open position, when the O-ring 116 lies within second channel 226, or the closed position, when the O-ring 116 lies within the first channel 224. In this way the temple member is retained bi-stably in either the open or closed position. If the temple member is rotated to an intermediate position, e.g., where the O-ring 116 is stretched over intermediate section 225, the temple member will be unstable with respect to the frame; any displacement of the temple member will tend to cause the O-ring to fall into one or the other of first and second channel sections 228 and 226, "snapping" the temple member into either the closed or open position, respectively. Thus the disclosed structure employs the O-ring to urge the temple member to either the closed or open position, providing the bi-stable position retention desired.

In some embodiments, a pair of indents 227 are provided in the surface 214a, and a small projection or ball 217 (see FIG. 5E) is provided on surface 210a, in order to provide an addition or alternative feature to help keep the temple member 214 in one of the two stable positions, open or folded, since the projection will settle into the corresponding indent when the temple member is fully open or fully closed. In some other embodiments (not shown), the indents 227 are vertical grooves that extend from the top edge to the bottom edge of surface 214a, and the projection 217 similarly extends from the top edge to the bottom edge of surface 210a. In some embodiments that include the two indents 227 and the projection 217, the slightly raised area 225 is omitted such that the areas between the bottom of groove 224 and the bottom of groove 226 is flat and of substantially the same cross-sectional area as that of groove 224 and that of groove 226, and thus the O-ring 116 and grooves 224 and 226 do not function to provide the bi-stable function, and instead the indent(s) and projection(s) do.

In some embodiments, slot 236 provides access to install and remove O-ring 116 into groove 224 and/or groove 226. Raised central area 225 has a slightly larger cross-sectional area than do the area inside groove 224 and the area inside groove 226.

The temple member 214 can readily be removed from the frame 210 by stretching the O-ring 116 sufficiently to pass it over the rear-most section 223.

Figure 3:
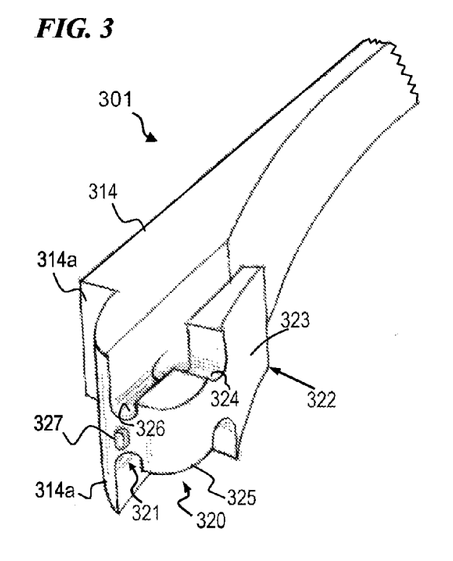
FIG. 3 is a perspective view of the hinge portion 301 of a right-hand temple member 314 according to some embodiments of the present invention.

FIG. 3 is a perspective view of the hinge portion 301 of a right-hand temple member 314 according to some embodiments of the present invention. Similar to embodiment 201 of FIG. 2A, in some embodiments, right-hand temple member 314 includes a cylindrical surface 314A. a position-stop surface 314b, a radially oriented side groove 324 for holding the temple member 314 in the folded position and a radially oriented front groove 326 for holding the temple member 314 in the open position, and between groove 324 and groove 326 is a raised area 325 that tends to urge the O-ring 116 into one or another of grooves 324 and 326. The wider portion 323 of rearward projection 322 helps to keep O-ring 116 from coming off. In some embodiments, an outward-oriented projection 327 is provided that assists the O-ring 116 maintain the temple member 314 in the open position.

Figure 4:
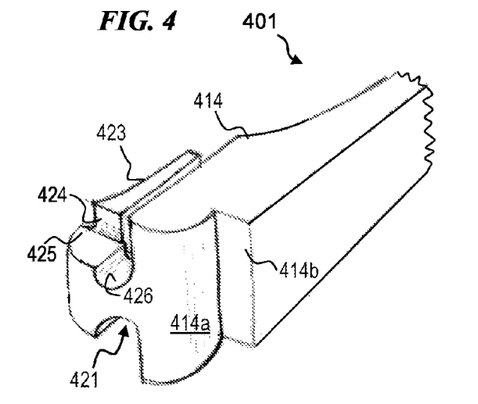
FIG. 4 is a perspective view of the hinge portion 401 of a left-hand temple member 414 according to some embodiments of the present invention.

The aperture through the lens frame used to hold the O-ring to the lens frame provides the negative space for projection 327;

FIG. 4 is a perspective view of the hinge portion 401 of a left-hand temple member 414 according to some embodiments of the present invention. Similar to embodiment 201 of FIG. 2A, in some embodiments, left-hand temple member 414 includes a cylindrical surface 414A. a position-stop surface 414b, a radially oriented side groove 424 for holding the temple member 414 in the folded position and a radially oriented front groove 426 for holding the temple member 414 in the open position, and between groove 424 and groove 426 is a raised area 425 that tends to urge the O-ring 116 into one or another of grooves 424 and 426. The wider portion 423 of rearward projection helps to keep O-ring 116 from coming off.

FIG. 5A is a cross-sectional plan view of a hinge portion 201 (shown in FIGS. 2A-2C) along the cut plane 5A-5A of FIG. 2A with temple member 214 in the stable extended position in relation to lens frame 210. For clarity, O-ring 116 and retaining pin 118 are not shown here.

FIG. 5B is a cross-sectional plan view of hinge portion 201 with temple member 214 in an unstable partially folded position. For clarity, O-ring 116 and retaining pin 118 are not shown here.

FIG. 5C is a cross-sectional plan view of hinge portion 201 with temple member 214 in the stable folded position. For clarity, O-ring 116 and retaining pin 118 are not shown here.

FIG. 5D is a cross-sectional plan view of hinge portion 201 with temple member 214 in the stable folded position also showing O-ring 116 and retaining pin 118.

Figure 5E:
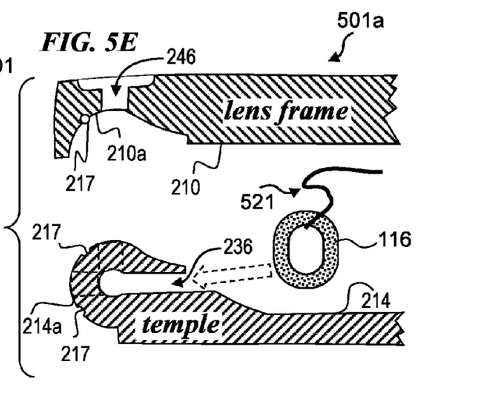
FIG. 5E is a cross-sectional plan view of hinge portion 201 with temple member 214 disconnected, showing the operation of inserting O-ring 116 into slot 235 of temple member 214.

FIG. 5E is a cross-sectional plan view of hinge portion 201 with temple member 214 disconnected, showing the operation of inserting O-ring 116 into slot 235 of temple member 214. This FIG. 5E shows a projection 217 (such as a molded protrusion on surface 210a, or a spring-loaded ball or other device that corresponds to indentations 227 on temple member 214) as well as aperture 246 through which O-ring 116 is stretched in order to insert pin 118 as shown in FIG. 5G.

Figure 5F:
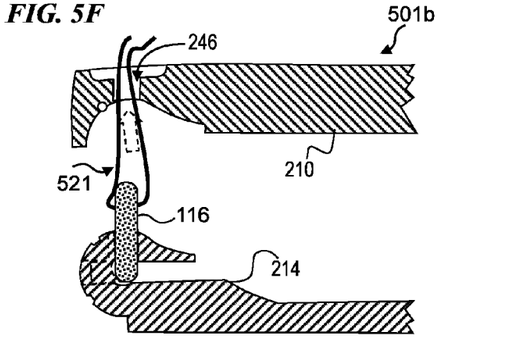
FIG. 5F is a cross-sectional plan view of hinge portion 201 with temple member 214 disconnected, showing the operation of inserting thread 521 through aperture 246 in frame 210.

FIG. 5F is a cross-sectional plan view of hinge portion 201 with temple member 214 disconnected, showing the operation of inserting thread 521 through aperture 246 in frame 210.

FIG. 5G is a cross-sectional plan view of hinge portion 201 with temple member 214 disconnected, showing the operation of stretching O-ring 116 through aperture 246 in frame 210 by pulling thread 521, in order to insert retaining pin 118. When the tension on filament 521 is released, pin 118 will fit into the recessed groove in the front face of lens frame 210, and the filament is removed, leaving the configuration shown in FIG. 5D.

FIG. 6A is a cross-sectional plan view of a hinge portion 601 according to another embodiment of the present invention (along a cut line similar to the cut plane 5A-5A of FIG. 2A) with temple member 614 in the stable extended position relative to lens frame 610. In this embodiment, the convex surface 610a (see FIG. 6D) of the cylindrical joint is made on the lens frame and the concave surface 612a is made on the temple member 614. The aperture for the O-ring 116 and the recess for retaining pin 118 are made out the side of the temple member 614. Other apparatus and method aspects of this embodiment are substantially similar to the other embodiments described herein.

Figure 6B:
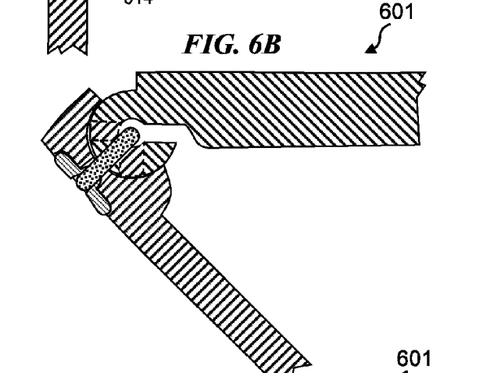
FIG. 6B is a cross-sectional plan view of hinge portion 601 with temple member 614 in an unstable partially folded position.

FIG. 6B is a cross-sectional plan view of hinge portion 601 with temple member 614 in an unstable partially folded position.

Figure 6C:
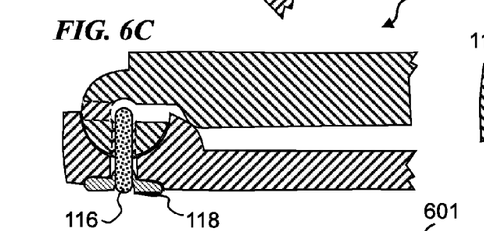
FIG. 6C is a cross-sectional plan view of hinge portion 601 with temple member 614 in the stable folded position.

FIG. 6C is a cross-sectional plan view of hinge portion 601 with temple member 614 in the stable folded position.

Figure 6D:
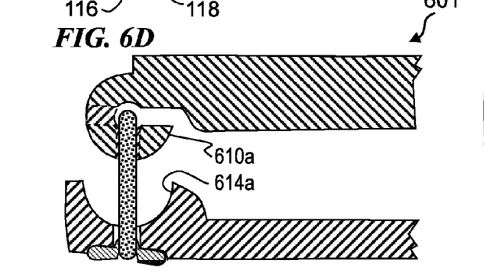
FIG. 6D is a cross-sectional plan view of hinge portion 601 with temple member 614 held away from frame 610 showing O-ring 118 in a stretched condition.

FIG. 6D is a cross-sectional plan view of hinge portion 601 with temple member 614 held away from frame 610 showing O-ring 118 in a stretched condition. In this embodiment, the concave surface 610a (see FIG. 6D) of the cylindrical joint is made into the lens frame 610 and the convex surface 614a is made on the temple member 614.

Figure 6E:
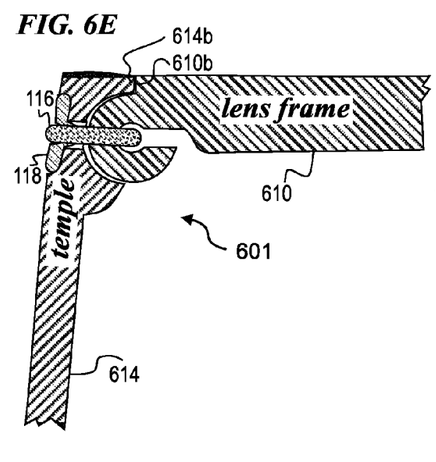
FIG. 6E is a cross-sectional plan view of hinge portion 601 with temple member 614 at an obtuse angle with O-ring 116 applying a gentle spring force urging temple member 614 back toward the stable extended position.

FIG. 6E is a cross-sectional plan view of hinge portion 601 with temple member 614 at an obtuse angle with O-ring 116 applying a gentle spring force urging temple member 614 back toward the stable extended position. When the temple member is overly extended like this, the flat face 610b extending outward (upward in the FIG. 6E) from the cylindrical joint on the frame 610 and the corresponding face 614b at the upper right of the temple member 614 abut and form a fulcrum against which the O-ring 116 pulls to provide a spring force on temple member 614 to gently return it to its normal extended orientation as shown in FIG. 6A.

FIG. 7A is a cross-sectional plan view of a hinge portion 701 according to another embodiment of the present invention (along a cut line similar to the cut plane 5A-5A of FIG. 2A) with temple member 714 in the stable extended position relative to lens frame 710. In this embodiment, the concave surface 710a (see FIG. 7D) of the cylindrical joint is made into the lens frame 710 and the convex surface 714a is made on the temple member 714. In this embodiment, the aperture for the O-ring 116, and the recess for retaining pin 118 are made out the front of lens frame 710. Other apparatus and method aspects of this embodiment are substantially similar to the other embodiments described herein.

FIG. 7B is a cross-sectional plan view of hinge portion 701 with temple member 714 in an unstable partially folded position.

FIG. 7C is a cross-sectional plan view of hinge portion 701 with temple member 714 in the stable folded position.

FIG. 7D is a cross-sectional plan view of hinge portion 701 with temple member 714 held away from frame 710 showing O-ring 118 in a stretched condition. In this embodiment, the concave surface 710a (see FIG. 7D) of the cylindrical joint is made into the lens frame 710 and the convex surface 714a is made on the temple member 714.

Figure 7E:
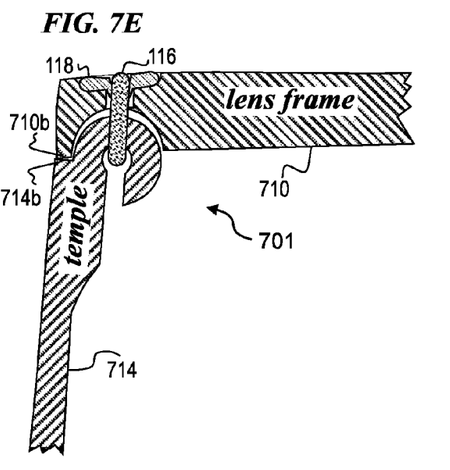
FIG. 7E is a cross-sectional plan view of hinge portion 701 with temple member 714 at an obtuse angle with O-ring 116 applying a gentle spring force urging temple member 714 back toward the stable extended position.

FIG. 7E is a cross-sectional plan view of hinge portion 701 with temple member 714 at an obtuse angle with O-ring 116 applying a gentle spring force urging temple member 714 back toward the stable extended position. When the temple member is overly extended like this, the flat face 710b extending outward (leftward in the FIG. 7E) from the cylindrical joint on the frame 710 and the corresponding face 714b at the upper right of the temple member 714 abut and form a fulcrum against which the O-ring 116 pulls to provide a spring force on temple member 714 to gently return it to its normal extended orientation as shown in FIG. 7A.

Figure 8A:
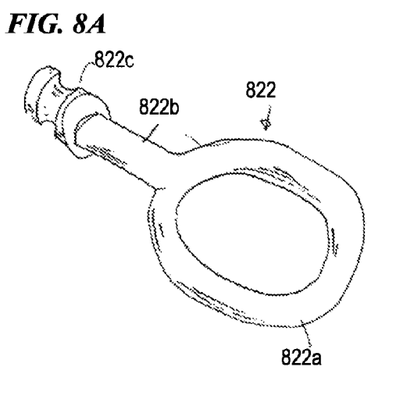
FIG. 8A is a perspective view of a custom-molded resilient member 801 used in lieu of the O-ring 116 of the FIGS. 1A-1E embodiment.
Figure 8B:
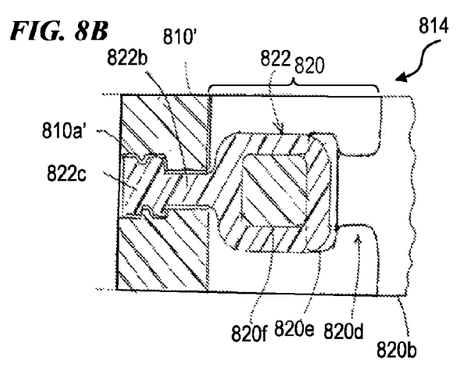
FIG. 8B is a cross-section view comparable to FIG. 1E but in an embodiment using the member 801 of FIG. 8A.

FIG. 8A shows a modified resilient member 822 that may be used in lieu of the O-ring 116 in a modified version of the hinge structure of the invention. Member 822 includes a loop section 822a that interacts with hinge structure 820 on the temple member as described above in connection with O-ring 116. The principal difference is simply in the manner of securing the member 822 to the frame 810'. In this case, rather than the proximal section of the O-ring being retained by pin 118 received in a recess in the frame 810, the member 822 includes a molded retention member 822c that is inserted into a correspondingly-shaped cavity 810a' in the front surface of frame 810' (see FIG. 8B) and connected to loop section 822a by a strand 822b extending through an aperture in the frame 810'. It will be apparent that the detailed design of retention member 822c and the correspondingly-shaped cavity 810a' could vary substantially while achieving the result described.

Figure 9A:
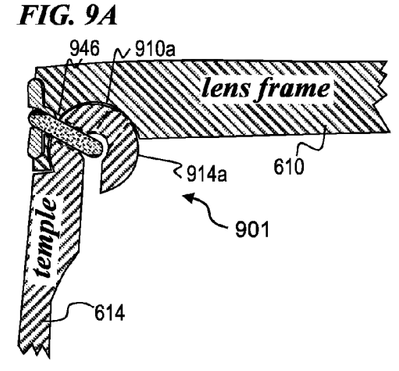
FIG. 9A is a cross-sectional plan view of a hinge portion 901 according to another embodiment of the present invention (along a cut line similar to the cut plane 5A-5A of FIG. 2A) with temple member 914 in the stable open position.

FIG. 9A is a cross-sectional plan view of a hinge portion 901 according to another embodiment of the present invention (along a cut line similar to the cut plane 5A-5A of FIG. 2A) with temple member 914 in the stable open position. In this embodiment, the concave surface 910a of the cylindrical joint is made into the lens frame 910 and the convex surface 914a is made on the temple member 914. In this embodiment, the aperture 946 for the O-ring 116 and the recess for retaining pin 118 are made out the lateral side of lens frame 710. Other apparatus and method aspects of this embodiment are substantially similar to the other embodiments described herein.

Figure 9B:
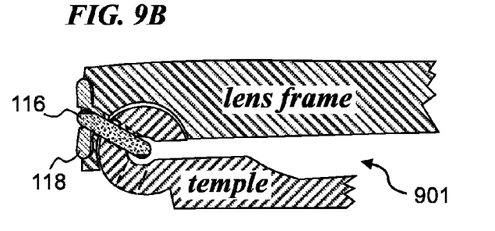
FIG. 9B is a cross-sectional plan view of hinge portion 901 with temple member 914 in the stable folded position.

FIG. 9B is a cross-sectional plan view of hinge portion 901 with temple member 914 in the stable folded position.

In some embodiments, the present invention provides an apparatus that includes: an eyeglasses frame configured to retain corrective lenses; and a pair of temple members hinged to the frame and configured to be moved between closed and open positions with respect to the frame, wherein the temple members are hinged to the frame by hinges, and wherein each hinge includes: cooperating surfaces formed on the frame and the temple member that define a hinge structure curved about a respective vertical hinge axis of the respective temple member with respect to the frame; and a closed-loop resilient member having a proximal end adapted to be secured to the frame, and a distal portion of the resilient member that extend through an aperture in one of the cooperating surfaces, wherein the hinge structure includes a slot configured to receive the closed-loop resilient member, and wherein the slot includes two channels that define two sections of reduced cross-sectional area separated by a section of increased cross-sectional area, such that as each respective temple member is rotated about its hinge axis to different angles with respect to the frame, the closed-loop resilient member tends to fit into one or the other of the two sections of reduced cross-sectional area to retain the respective temple member in one of two predetermined angular positions with respect to the frame.

Some embodiments of the apparatus further include a pair of lenses affixed to the frame to form eyeglasses.

In some embodiments of the apparatus, each resilient member comprises an elastomeric O-ring, and wherein the proximal portion of the O-ring is secured to the frame by a pin that is positioned through an opening in the O-ring and received in a recess in a forward surface of the frame.

In some embodiments of the apparatus, each resilient member comprises a closed loop having a stem molded integrally therewith and joined to the loop at a distal end of the stem, wherein a proximal end of the stem is formed to include a terminating member, wherein the terminating member is sized and shaped so as to be received and retained in a correspondingly shaped and sized cavity in a forward surface of the frame.

In some embodiments of the apparatus, the slot passes through a distal section of increased cross-sectional area as compared to the two sections of reduced cross-sectional area, whereby the closed-loop resilient member is retained in the slot.

In some embodiments of the apparatus, each cooperating surface formed on the frame is a concave socket that has vertical cylindrical wall with a semicircular cross-section, and wherein the cooperating surface formed on each frame is a convex tongue (e.g., 228 of FIGS. 2A, 2B, and 2C) that has vertical cylindrical wall with a semicircular cross-section.

In some embodiments of the apparatus, each cooperating surface formed on the frame is a convex tongue that has vertical cylindrical wall with a semicircular cross-section, and wherein the cooperating surface formed on each frame is a concave socket that has vertical cylindrical wall with a semicircular cross-section.

In some embodiments of the apparatus, each hinge forms a cylindrical joint, and wherein each cylindrical joint is held together by the closed-loop resilient member.

In some embodiments, the present invention provides a method that includes providing an eyeglasses frame configured to retain corrective lenses; providing a pair of temple members configured to be moved between closed and open positions with respect to the frame, wherein each temple member is hinged to the frame by a hinge, and wherein each hinge includes cooperating surfaces formed on the frame and the temple member that define a hinge structure curved about a respective vertical hinge axis of the respective temple member with respect to the frame; providing a pair of closed-loop resilient members; securing a proximal end of each respective closed-loop resilient member to the frame; securing a distal end of each respective closed-loop resilient member to a respective one of the pair of temple members such that as each respective temple member is rotated about its respective hinge axis to different angles with respect to the frame, the closed-loop resilient member tends retain the respective temple member in one of two predetermined angular positions with respect to the frame.

Some embodiments of the method further include affixing a pair of lenses to the frame to form eyeglasses.

In some embodiments of the method, each resilient member comprises an elastomeric O-ring, wherein the securing of the proximal end of each respective closed-loop resilient member to the frame further includes: positioning a pin that through an opening in the O-ring; and receiving the pin in a recess in a forward surface of the frame.

In some embodiments of the method, each resilient member comprises a closed loop having a stem molded integrally therewith and joined to the loop at a distal end of the stem, wherein a proximal end of the stem is formed to include a terminating member, wherein the securing of the proximal end of each respective closed-loop resilient member to the frame further includes receiving and retaining the terminating member of the stem in a correspondingly shaped and sized cavity in a forward surface of the frame.

In some embodiments of the method, each cooperating surface formed on the frame is a concave socket that has vertical cylindrical wall with a semicircular cross-section, wherein the cooperating surface formed on each frame is a convex tongue that has vertical cylindrical wall with a semicircular cross-section.

In some embodiments of the method, each temple member includes a slot that passes through a distal section of the temple member that has increased cross-sectional area as compared to two grooves that each define a portion of the temple member having a reduced cross-sectional area, such that the respective closed-loop resilient member is retained in the slot, and wherein the two grooves provide preferred positions for the respective closed-loop resilient member to hold the temple members in open and folded positions.

In some embodiments of the method, each resilient member comprises an elastomeric O-ring, and wherein the securing of the proximal end of each respective closed-loop resilient member to the frame further includes: passing a filament through an opening in the O-ring; placing the distal end of O-ring in the slot at the distal section of one of the temple members; passing two ends of the filament through an aperture in the frame; pulling the proximal end of the O-ring through the aperture in the frame using the filament; positioning a pin through an opening in the O-ring; and receiving the pin in a recess in a forward surface of the frame.

In some embodiments, the present invention provides an apparatus that includes: a spectacles frame and two temple members, wherein each respective temple member is held to the spectacles frame at a cylindrical joint held together by an elastomeric closed-loop ring.

In some embodiments of the apparatus, the frame includes a rotation-stop surface extending radially from each respective cylindrical joint, and wherein each respective temple member includes a corresponding rotation-stop surface extending radially from the respective cylindrical joint, and wherein the rotation-stop surface extending radially from each respective cylindrical joint on the frame abuts the corresponding rotation-stop surface extending radially from the respective cylindrical joint on the respective temple member.

In some embodiments of the apparatus, a surface of the frame at each cylindrical joint is concave, and wherein a surface of each temple member at each cylindrical joint is convex.

In some embodiments of the apparatus, the elastomeric closed-loop ring is an O-ring.

In some embodiments of the apparatus, each respective cylindrical joint includes a first stable angular orientation that holds the respective temple member in an open orientation and a second stable angular orientation that holds the respective temple member in a folded orientation, and wherein angular orientations between the first angular orientation and the second angular orientation are less stable than the first angular orientation and the second angular orientation.

In some embodiments of the apparatus, each respective cylindrical joint includes a first stable angular orientation that holds the respective temple member in an open orientation and an overly extended open position that is unstable and tends to return respective temple member to the first stable angular orientation.

In some embodiments of the apparatus, each respective cylindrical joint includes a first stable angular orientation that holds the respective temple member in an open orientation and an overly extended open position that is spring-loaded to return respective temple member to the first stable angular orientation.

In some embodiments of the apparatus, the elastomeric closed-loop ring includes a stem extending radially from the elastomeric closed-loop ring, such that a portion of the elastomeric closed-loop ring forms an axis of rotation for the cylindrical joint and the stem is retained in a cavity that extends radially from the cylindrical joint.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
    an eyeglasses frame configured to retain corrective lenses; and
    a pair of temple members hinged to the frame and configured to be moved between closed and open positions with respect to the frame, wherein the temple members are hinged to the frame by hinges, and wherein each hinge includes:
        cooperating surfaces formed on the frame and the temple member that define a hinge structure curved about a respective vertical hinge axis of the respective temple member with respect to the frame; and
        a closed-loop resilient member having a proximal end adapted to be secured to the frame, and a distal portion of the resilient member that extends through an aperture in one of the cooperating surfaces;
    wherein the hinge structure includes a slot configured to receive the closed-loop resilient member, and wherein the slot includes two channels that define two sections of reduced cross-sectional area separated by a section of increased cross-sectional area, such that as each respective temple member is rotated about its hinge axis to different angles with respect to the frame, the closed-loop resilient member tends to fit into one or the other of the two sections of reduced cross-sectional area to retain the respective temple member in one of two predetermined angular positions with respect to the frame.

2. The apparatus of claim 1, further comprising a pair of lenses affixed to the frame to form eyeglasses.

3. The apparatus of claim 1, wherein each resilient member comprises an elastomeric O-ring, and wherein the proximal portion of the O-ring is secured to the frame by a pin that is positioned through an opening in the O-ring and received in a recess in a forward surface of the frame.

4. The apparatus of claim 1, wherein each resilient member comprises a closed loop having a stem molded integrally therewith and joined to the loop at a distal end of the stem, wherein a proximal end of the stem is formed to include a terminating member, wherein the terminating member is sized and shaped so as to be received and retained in a correspondingly shaped and sized cavity in a forward surface of the frame.

5. The apparatus of claim 1, wherein the slot passes through a distal section of increased cross-sectional area as compared to the two sections of reduced cross-sectional area, whereby the closed-loop resilient member is retained in the slot.

6. The apparatus of claim 1, wherein each cooperating surface formed on the frame is a concave socket that has vertical cylindrical wall with a semicircular cross-section, and wherein the cooperating surface formed on each frame is a convex tongue that has vertical cylindrical wall with a semicircular cross-section.

7. The apparatus of claim 1, wherein each cooperating surface formed on the frame is a convex tongue that has vertical cylindrical wall with a semicircular cross-section, and wherein the cooperating surface formed on each frame is a concave socket that has vertical cylindrical wall with a semicircular cross-section.

8. The apparatus of claim 1, wherein each hinge forms a cylindrical joint, and wherein each cylindrical joint is held together by the closed-loop resilient member.

9. A method comprising:
providing an eyeglasses frame configured to retain corrective lenses;
providing a pair of temple members configured to be moved between closed and open positions with respect to the frame, wherein each temple member is hinged to the frame by a hinge, and wherein each hinge includes cooperating surfaces formed on the frame and the temple member that define a hinge structure curved about a respective vertical hinge axis of the respective temple member with respect to the frame;
providing a pair of closed-loop resilient members;
securing a proximal end of each respective closed-loop resilient member to the frame; and
securing a distal end of each respective closed-loop resilient member to a respective one of the pair of temple members such that as each respective temple member is rotated about its respective hinge axis to different angles with respect to the frame, the closed-loop resilient member tends to retain the respective temple member in one of two predetermined angular positions with respect to the frame, wherein each resilient member comprises an elastomeric O-ring, and wherein the securing of the proximal end of each respective closed-loop resilient member to the frame further includes:
positioning a pin through an opening in the O-ring; and
receiving the pin in a recess in a forward surface of the frame.

10. The method of claim 9, further comprising
affixing a pair of lenses to the frame to form eyeglasses.

11. The method of claim 9, wherein each cooperating surface formed on the frame is a concave socket that has vertical cylindrical wall with a semicircular cross-section, and wherein the cooperating surface formed on each frame is a convex tongue that has a vertical cylindrical wall with a semicircular cross-section.

12. The method of claim 9, wherein each temple member includes a slot passing through a distal section of the temple member that has increased cross-sectional area as compared to two grooves that each define a portion of the temple member having a reduced cross-sectional area, such that the respective closed-loop resilient member is retained in the slot, and wherein the two grooves provide preferred positions for the respective closed-loop resilient member to hold the temple members in open and folded positions.

13. A method comprising:
providing an eyeglasses frame configured to retain corrective lenses;
providing a pair of temple members configured to be moved between closed and open positions with respect to the frame, wherein each temple member is hinged to the frame by a hinge, and wherein each hinge includes cooperating surfaces formed on the frame and the temple member that define a hinge structure curved about a respective vertical hinge axis of the respective temple member with respect to the frame;
providing a pair of closed-loop resilient members;
securing a proximal end of each respective closed-loop resilient member to the frame; and
securing a distal end of each respective closed-loop resilient member to a respective one of the pair of temple members such that as each respective temple member is rotated about its respective hinge axis to different angles with respect to the frame, the closed-loop resilient member tends to retain the respective temple member in one of two predetermined angular positions with respect to the frame, wherein each temple member includes a slot passing through a distal section of the temple member that has increased cross-sectional area as compared to two grooves that each define a portion of the temple member having a reduced cross-sectional area, such that the respective closed-loop resilient member is retained in the slot, wherein the two grooves provide preferred positions for the respective closed-loop resilient member to hold the temple members in open and folded positions, wherein each resilient member comprises an elastomeric O-ring, and wherein the securing of the proximal end of each respective closed-loop resilient member to the frame further includes:
passing a filament through an opening in the O-ring;
placing the distal end of O-ring in the slot at the distal section of one of the temple members;
passing two ends of the filament through an aperture in the frame;
pulling the proximal end of the O-ring through the aperture in the frame using the filament;
positioning a pin through an opening in the O-ring; and
receiving the pin in a recess in a forward surface of the frame.

* * * * *